Oct. 21, 1969  H. C. RICE  3,473,775
SAFETY BRACKET FOR VEHICLE SEAT ADJUSTERS
Filed Oct. 31, 1966  2 Sheets-Sheet 1
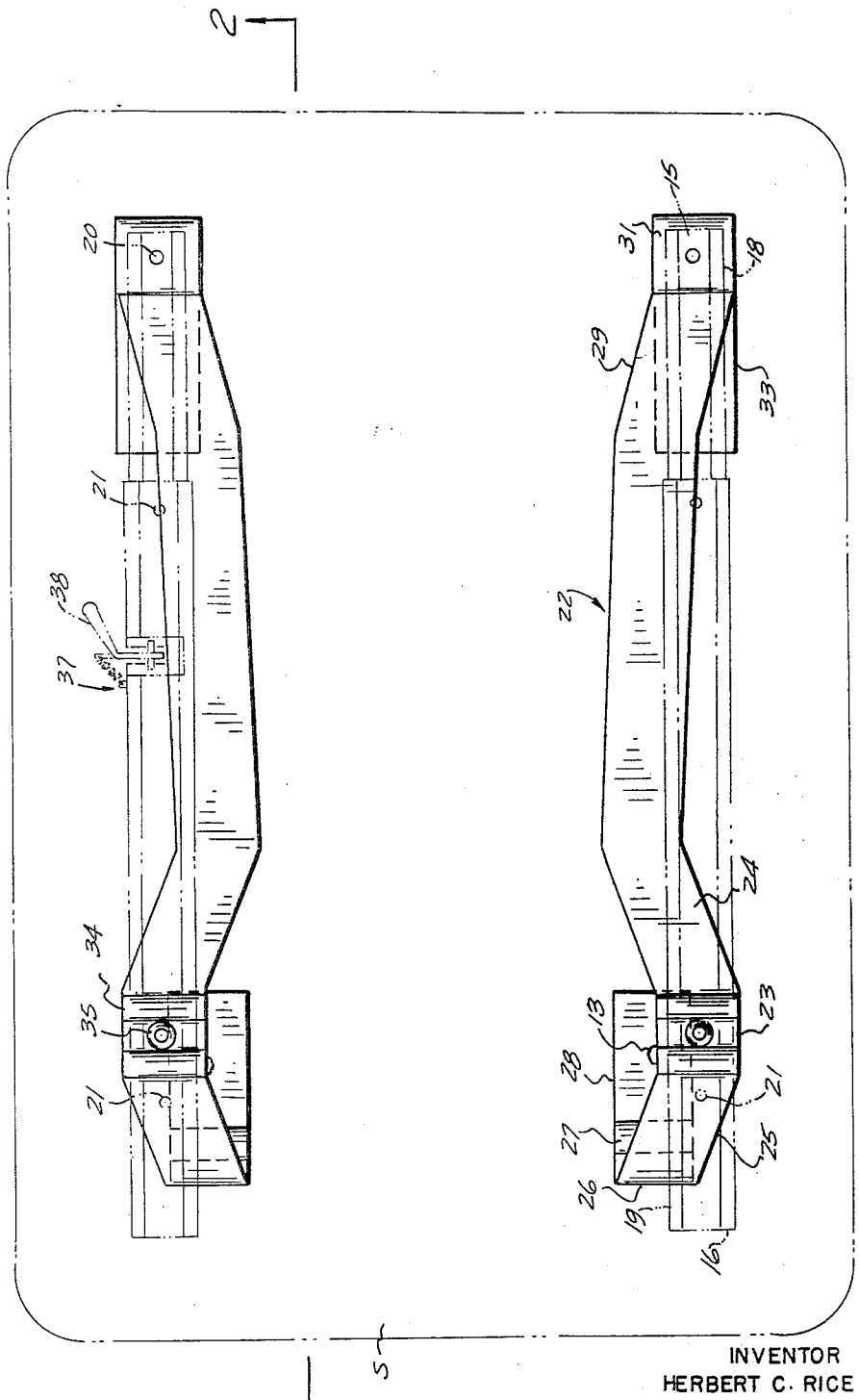
FIG. I
INVENTOR
HERBERT C. RICE
BY  ATTORNEYS

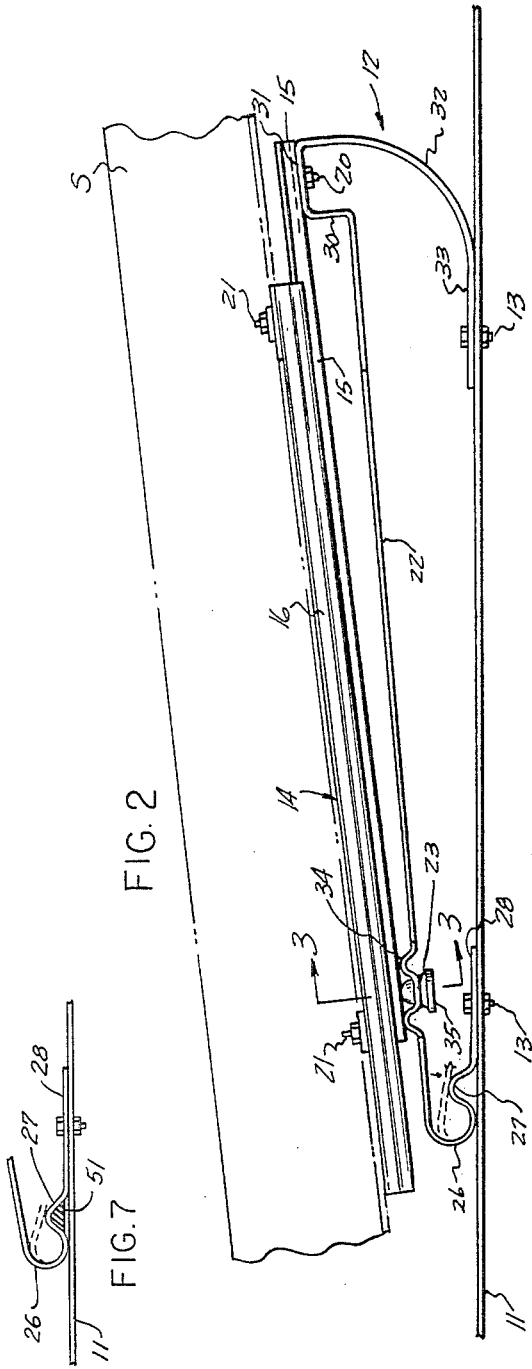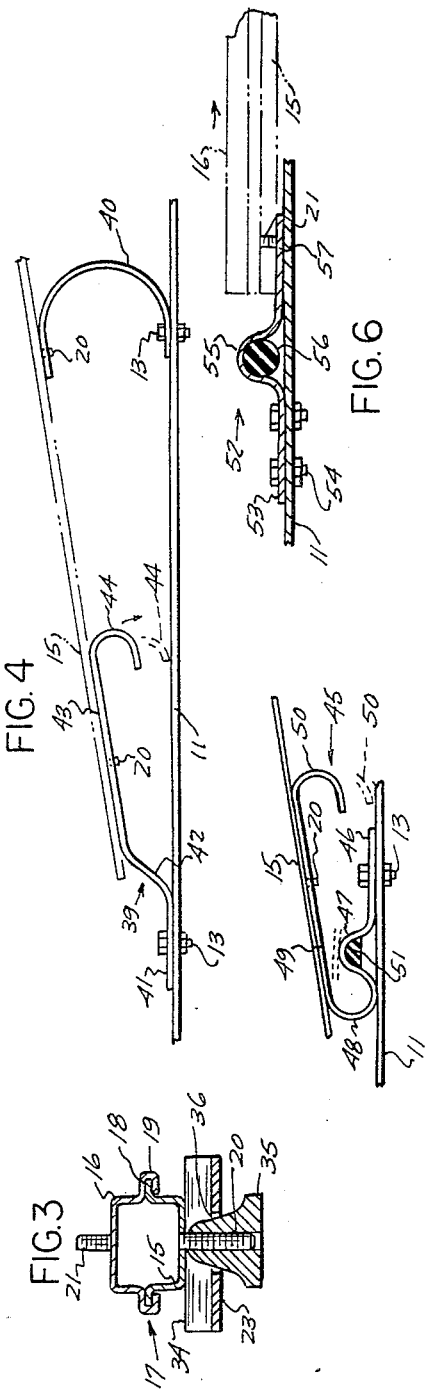

United States Patent Office 3,473,775
Patented Oct. 21, 1969

1

3,473,775
SAFETY BRACKET FOR VEHICLE
SEAT ADJUSTERS
Herbert C. Rice, Detroit, Mich., assignor to Midland Adhesive and Chemical Corporation, a subsidiary of Grow Chemical Corporation of New York, Ferndale, Mich.
Filed Oct. 31, 1966, Ser. No. 590,715
Int. Cl. B60n 1/02, 1/08; B60r 21/02
U.S. Cl. 248—399                          8 Claims

ABSTRACT OF THE DISCLOSURE

A safety bracket assembly for mounting a seat adjuster upon the vehicle floor and in combination with such adjuster, wherein the seat adjuster is substantially parallel to the longitudinal axis of said bracket assembly, including forwardly extending strips of steel with reversed turn free ends secured to said floor, and with the bracket assembly forwardly yieldable only on crash impact for gradual absorption of impact forces, downward direction of input energy adapted to cradle a seat on said adjuster and bias a passenger down into the seat and reduce seat belt impact.

---

It is an object of the present invention to provide a safety bracket assembly for mounting seats supporting adjusters upon a vehicle floor, and in combination with such adjuster and wherein said bracket assembly is formed of steel and wherein free end portions thereof are turned so as to engage and be adapted to be secured to the vehicle floor to thus provide a safety bracket assembly which is yieldable only on crash impact for gradual absorption of impact forces and wherein downward direction of input energy is adapted to cradle a seat upon the said adjusters and to bias a passenger down into the seat.

It is a further object of the present invention to provide a safety bracket assembly wherein seat adjusters are mounted upon portions of the bracket assembly parallel to and in general longitudinal alignment therewith whereby the bracket assembly is adapted to absorb crash impact from all directions.

It is a further object to provide a safety bracket assembly for mounting vehicle seat adjusters which due to the characteristic of longitudinal yielding in the direction of mounting of the said seat adjusters and for gradual absorption of impact shock is adapted to provide minimum strain on seat belts and for minimizing injury to occupants.

It is a further object to provide a safety bracket construction, which is substantially rigid and non-yielding for most normal driving but provides for resilient progressive force absorption on crash impact of the vehicle.

These and other objects will be seen from the following specification and claims in conjunction with the appended drawings, in which:

FIG. 1 is a fragmentary plan view of the present safety bracket mounting seat adjusters, the seat being shown in phantom.

FIG. 2 is a fragmentary section taken in the direction of arrows 2—2 of FIG. 1.

FIG. 3 is a fragmentary section on an increased scale, taken in the direction of arrows 3—3 of FIG. 2.

FIG. 4 is a fragmentary side elevational view of a modified safety bracket.

FIG. 5 is a similar view with a further modified safety bracket.

2

FIG. 6 is a fragmentary longitudinal section of a still further modified safety bracket.

FIG. 7 shows a fragmentary modification of FIG. 2.

It will be understood that the foregoing drawings illustrate merely preferred embodiments of the invention, and that other embodiments are contemplated within the scope of the claims hereafter set forth.

Referring to the drawings, the present invention is directed to a safety bracket generally indicated at 12, adapted to supportably mount a seat adjuster 14 upon a vehicle floor or frame 11, fragmentarily shown, employing suitable fasteners 13.

The seat adjuster, of which normally a pair are employed in parallel relation, extends forwardly of the long axis of the vehicle and includes a conventional elongated channel type of track 15, with out-turned elongated guide flanges 18. Slideably mounted thereover is an opposed channel type of rail 16, including inturned opposed channels 18 interlocked with flanges 18. Said track includes depending fasteners 20 for mounting and securing over and upon safety bracket 12. Suitable anchoring means are employed, namely, castellated tapered nuts 35, FIGS. 2 and 3.

Each rail includes a pair of longitudinally spaced upwardly extending bolts or threaded studs 21, for mounting the conventional seat S thereover bridging a pair of said seat adjusters in a conventional manner.

The present safety bracket, constructed of spring steel, includes a forwardly and upwardly extending elongated unit pattern formed strip 22. Said strip adjacent its rear portion has a coplanar lateral offset 23, connected by first angular member 24, FIG. 1, and the second angular member 25. The latter terminates at the rear of the strip in the circularly shaped loop 26, FIG. 2, engageable with floor 11. Said loop terminates in the flat base support 28 in registry with floor 11 and secured thereto at 13. Intermediate loop 26 and support 28 is the arcuate upwardly curved hump 27, normally spaced from the overlying portion of strip 22.

The forward portion of strip 22 has a third angular part 29 which terminates in step 30, FIG. 2, which merges with platform 31, adapted to support forward end portions of the seat adjuster track secured thereto by fastener 20. Platform 31 terminates in the downwardly curved extension 32, which merges into flat support 33, engageable with floor or frame 11, and secured thereto at 13.

Lateral offset 23 is normally displaced outwardly from the longitudinal axis of strip 22, and has formed thereacross a pair of spaced upwardly extending transverse corrugations 34, upon which is supported the rear end portion of seat adjuster track 15. Stud 20 and fastener 35 secure rear end portions of the seat adjuster to offset 23 intermediate said corrugations.

In one embodiment FIG. 3, the fastener is, a castellated tapered nut 35 threaded over depending stud 20 on track 15. Said stud extends loosely through oversize aperture 36, in strip 22 between corrugations 34. This construction provides a flexible connection between the seat adjuster and strip corrugations 34 to permit limited transverse torsion tilting movements of offset 23. This is particularly advantageous since the seat adjuster studs 21 are fixedly secured to undersurface portions of seat S. This provides a means of accommodating the seat adjusters to transverse angular torsional twisting movements of offset 23 as distinguished from a rigid fixed connection.

Though forming no part of the present safety brackets there is shown in dotted lines of FIG. 1 one form of conventional interlock 37 normally spring biased for adjustably anchoring the longitudinally adjustable rail 16 with respect to stationary track 15, and incorporating manual release 38.

MODIFICATION NUMBER 1

A modification of the present safety bracket is shown in FIG. 4, which fragmentarily indicates the vehicle frame or floor 11 upon which is secured at 13 another form of safety bracket, generally indicated at 39 and 40. This includes a pair of longitudinally aligned front and rear safety bracket elements, for mounting the conventional seat adjuster track 15, fragmentarily shown. Said track is anchored to the respective bracket elements 39 and 40 by fasteners 20.

In this modification the safety bracket elements 39 and 40 are constructed to spring steel.

Bracket element 39 includes a forwardly and upwardly extending strip or track support 43, which, towards its rear end includes an S-curved portion 42 terminating in rear support 41 engaging floor 11 and secured thereto at 13. The reverse curved loop 44 extends from the front end of strip 43 and is normally spaced above floor 11, but under crash impact conditions will engage said floor, as shown in dotted lines, FIG. 4.

The safety seat bracket element 40 is a C-shaped spring steel support arranged forwardly of, and aligned with strip 43, with its free ends extending towards said strip. One free end overlies floor 11 and is secured thereto at 13, FIG. 4.

The seat adjuster rail 15 at its rear end portion overlies and is in alignment with strip 43, and secured thereto at 20. The forward end portion of rail 15 overlies bracket element 40 and is secured thereto at 20.

The safety bracket assemblies 39 and 40, arranged in alignment for supporting a seat adjuster at the proper inclination for seat S will maintain during normal driving conditions a substantially rigid relationship and occupy substantially the same amount of space as the conventional rigid riser for seat adjusters.

The present safety bracket for the seat adjuster, responds to crash impacts upon the vehicle. It is only then that certain flexing of the safety bracket occurs, FIG. 4 and wherein on crash impact the respective safety bracket element 39 will tend to move downwardly into impact energy absorbing operative engagement with floor 11 in progressive stages to cradle the seat so as to gradually absorb impact energy for the protection of the occupant upon the seat employing the conventional seat belt.

The same thing is true with respect to FIG. 2 wherein safety bracket 12 in normal operation of the vehicle maintains the inclination of strip 22, and only changes as the result of crash impact forces for the protection of the passenger against serious injury.

Upon impact, regardless of direction of impact, the present safety bracket flexes to cradle the seat for gradual absorption of impact forces. This minimizes substantially, the serious ill effects with conventional rigid track mountings.

With respect to the safety bracket shown in FIG. 2 a crash impact on the vehicle will cause the seat adjuster support portions of strip 22 at its rear to flex downwardly into operative crash energy absorbing engagement with hump 27 and with additional crash energy absorbing collapse of said hump relative to the floor. At the same time there will be an additional simultaneous crash energy absorbing movement of the forward curved portion 32 of the safety bracket.

MODIFICATION NUMBER 2

The second modification is shown fragmentarily in FIG. 5 wherein the rear safety bracket 45 of spring steel is adapted for use with a forwardly arranged and aligned safety bracket, such as bracket 40 of C-shape in FIG. 4. These cooperate to provide suitable support for the fragmentarily shown seat adjuster track 15, anchored thereto in the same manner as above described as by fasteners 20. Said seat adjuster spans the two longitudinally aligned safety bracket assemblies 45 and 40, upon which one side of a vehicle seat S is mounted and secured in a conventional manner.

The safety bracket 45, is similar to bracket 12, FIG. 2. Track support strip 49 is arranged to extend forwardly and upwardly and has a reverse turned semi-circular loop 50, and whose free end is normally spaced from floor 11 fragmentarily shown; but which upon crash impact moves downwardly into collapsing engagement therewith. The rear portion of strip 49 terminates in the reverse turned loop 48, generally circular in construction, which is adapted to bear against floor 11. Said loop terminates in base support 46 anchored at 13 to the floor or frame 11. Intermediate loop 48 and support 46 there is provided the upwardly curved arcuate hump 47 normally spaced above floor 11 and below overlying portions of strip 49, FIG. 5, in normal operation.

The resilient bumper 51 constructed of rubber or neoprene or other resilient plastic material is nested within hump 47. Said bumper serves a further crash energy absorption function upon downward crash impact movement of strip 49 into engagement with hump 47, and successive collapsing thereof and said bumper relative to floor 11. This same flexible bumper 51 may be employed within the hump 27 of FIG. 2 to provide an assist in crash energy absorption during crash impact, such as shown in FIG. 7.

The forward portion of the seat adjuster, fragmentarily shown at 15 in FIG. 5, overlies a C-shaped support assembly such as shown at 40, FIG. 4, to complete the mounting of the seat adjuster with respect to the floor. This is a modified safety bracket assembly wherein, under normal operation of the vehicle the seat adjuster track 15 will retain the inclination shown and will only be distorted and deformed downwardly and collapsed as a result of crash impacts.

MODIFICATION NUMBER 3

Another modification is shown in FIG. 6, wherein one of a pair of longitudinally spaced aligned safety brackets 52 of spring steel are provided upon floor 11 and fixedly secured thereto at their respective rear ends as by fasteners 54. In this embodiment the seat adjuster is generally indicated fragmentarily in dotted lines at 16 so that its rear portion overlies and is secured at 21 to a forward free end portion 57 of anchor support 53. The forward portion of seat adjuster 16, not shown, also overlies a similar safety bracket 52, not shown, and wherein a forward portion of the seat adjuster 16 is fixedly secured in a similar manner as by fasteners 21 to the forward free end portion 57 of the second forwardly aligned safety bracket 52.

Intermediate the anchored end of support strip 53 and its forward free end 57 there is an upwardly curved hump 55, normally spaced from floor 11. In said hump is mounted resilient bumper 56 of rubber, neoprene or other plastic material adapted for cooperation with the spring steel of safety bracket 52 in the event of crash impact normally producing longitudinal forward stresses upon seat adjuster 16. These stresses are of such force as to effect longitudinal lengthening of the free end portions 57 of the respective anchor supports 53. This causes a flattening out downwardly of the respective humps 55, and bumpers 56 relative to floor 11. Such an assembly may be used in a sports car wherein the seat may not be elevated by the safety brackets shown in FIGS. 2, 4 and 5

The same function and operation is present, namely, crash impact transmitted to seat adjuster 16 is yieldably and resiliently resisted by the forward free end portions 57 of the respective safety brackets 52. This causes a downward collapsing movement of the respective humps 55, relative to the floor, for the purpose of gradually absorbing crash energy and for minimizing injury to a passenger on the seat employing the conventional seat belt.

This construction, like the preceding modifications provides a means for the gradual absorption of impact forces, with said impact forces acting downwardy, producing corresponding energy absorbing downward collapse of the respective humps and bumpers.

The present safety brackets maintain their shape during normal operation of the vehicle and only collapse or yield downwardly on crash impact for all the purposes above set forth.

In conjunction with the safety factors herein above described in connection with the absorption of crash impact forces for the protection of passengers using seat belts, the offset torque mounting of the rear end portions of the seat adjusters, such as shown in FIGS. 1, and 2, sets up certain additional torsional bending stresses resisted by the resiliency of the spring steel which cooperate in the safety bracket construction for assisting in the absorption of impact energy.

At the same time the eccentric mounting or displaced mountings of the rear end portions of the seat adjusters provide for a more comfortable ride against uneven surface conditions, in that there may be limited amounts of torsional twisting reactions of the strip, in the embodiment shown in FIG. 1, and which is particularly helpful in harder rides provided by the radial type of tire, though not limited thereto.

The design of all yielding members, forward and rearward, in such that on crash impact, the direction of yielding action will, in the split second of impact, cradle the seat by raising the front of the seat and lowering the rear of the seat.

This cradling action is a prime factor in reducing "whiplash" as it permits body and head to move in unison during the critical impact period of rear end collisions.

Raising the front of the seat on impact is accomplished by the upward yielding of the strip ahead of floor fastening 13, which yields in proportion to the rearward impact force of weight in seat and its leverage.

In the event of front end collision, the front of the seat is raised in cradle position by the design of the forward portions at 12 in FIG. 2 and at 40 in FIG. 4.

In front end collisions as to the rearward portion of the members (at 26 in FIG. 2, at 39 in FIG. 4, at 48 in FIG. 5, and at 55 in FIG. 6) the design is such as to establish a forward and downward action. This action becomes rearward and downward in the event of rear end collision.

Major benefits to occupants ensure when the seat is in cradled position. For example, in the event of front end collision the occupants are literally driven into the seat cushion on the split second impact, . . . thus absorbing in the buttocks area, a great, and critical, part of the shock impact. Should the impact be severe enough to bounce the passengers off the cushion . . . their "flight pattern" would be upward toward the roof of the car, provided no seat belts are worn.

With conventional seating the "flight pattern" is forward toward instrument panel and windshield area . . . at high velocity as a result of rigid, abrupt checking of crash impact. This rigid checking also subjects the entire seat structure, seat adjuster, floor mountings and seat belts . . . to abnormal strain and stress.

Having described my invention, reference should now be had to the following claims.

I claim:
1. A safety bracket for supportably mounting a vehicle seat adjuster upon a vehicle floor comprising;
   a forwardly and upwardly extending elongated unit pattern formed strip of steel;
   a reverse turned loop at its rear end engageable with said floor;
   said loop merging into a flat base support adapted for anchoring to said floor;
   a downwardly curved extension projecting from the forward end of said strip, adapted for anchoring to said floor;
   said bracket being forwardly yieldable only on crash impact for gradual absorption of impact forces;
   downward direction of impact energy and crandling of the seat biasing the passenger down into the seat and greatly reducing seat belt impact;
   a lateral offset coplanar with and extending from the rear end of said strip and displaced from its longitudinal axis adapted to support and secure one end of a seat adjuster overlying said strip;
   the forward end of said set adjuster being anchored to the forward end of said strip.

2. In the safety bracket of claim 1, a pair of spaced upwardly extending transverse corrugations formed in said offset;
   said seat adjuster overlying said strip with its rear end extending over and bridging said corrugations;
   and fastening means securing the rear end of said seat adjuster to said strip intermediate said corrugations.

3. In the safety bracket of claim 2, said fastening means including a stud, depending from an adjacent part of said seat adjuster and through an oversize aperture in said strip;
   and a castellated tapered nut threaded onto said stud, loosely extending into said oversize aperture and arranged to permit limited transverse torsion tilting movements of adjacent portions of said strip relative to said seat adjuster.

4. In the safety bracket of claim 2, and an arcuate upwardly curved hump in said strip intermediate said loop and said base support, normally spaced from the undersurface portions of said strip thereabove;
   crash impact causing the seat adjuster support portions of said strip to flex downwardly into operative crash energy absorbing engagement with said hump, and successive crash energy absorbing collapse of said hump relative to said floor, crash impact causing front support portions of said strip to flex upwardly to cradle the seat.

5. In the safety bracket of claim 1, a raised platform at the forward end of said strip;
   said seat adjuster spanning said offset and platform.

6. In the safety bracket of claim 1, said offset seat adjuster mounting creating a yieldable torque reaction for absorbing road shock in normal operation of the vehicle, and on crash impact, cooperating wih downward flexing crash energy absorbing movement of said strip, front support portions of said strip flexing upwardly to cradle the seat.

7. A safety bracket for supportably mounting a vehicle seat adjuster upon a vehicle floor comprising;
   a forwardly and upwardly extending elongated unit pattern formed strip of steel;
   a reverse turned loop at its rear end engageable with said floor;
   said loop merging into a flat base support adapted for anchoring to said floor;
   a downwardly curved extension projecting from the forward end of said strip, adapted for anchoring to said floor;
   said bracket being forwardly yieldable only on crash impact for gradual absorption of impact forces;
   downward direction of impact energy and cradling of the seat biasing the passenger down into the seat and greatly reducing seat belt impact;
   and an arcuate upwardly curved hump in said strip intermediate said loop and said base support and normally spaced from the undersurface of portions of said strip thereabove;
   crash impact causing the seat adjuster support portions of said strip to flex downwardly into operative crash energy absorbing engagement with said hump and successive crash energy absorbing collapse of said hump relative to said floor;

crash impact causing front support portions of said strip to flex upwardly to cradle the seat.

8. In the safety bracket of claim 7, a collapsible resilient bumper rested within said hump.

References Cited

UNITED STATES PATENTS

| | | |
|---|---|---|
| 233,689 | 10/1880 | O'Conner. |
| 328,564 | 10/1885 | Bostwick et al. __ 248—399 XR |
| 1,777,463 | 10/1930 | Dearing _____ 248—387 XR |
| 2,068,996 | 1/1937 | Smith _____ 248—387 XR |
| 2,202,301 | 5/1940 | Probst. |
| 2,101,422 | 12/1937 | Assalit _____ 297—302 |
| 2,141,262 | 12/1938 | Cole _____ 297—294 |
| 2,845,111 | 7/1958 | Barecki et al. _____ 297—300 |

FOREIGN PATENTS 247,585   3/1947   Switzerland.

FRANCIS K. ZUGEL, Primary Examiner

U.S. Cl. X.R.

248—429; 297—216, 300